Feb. 4, 1969  E. L. EGBERT ET AL  3,425,220
HYDRODYNAMIC TORQUE TRANSMITTING UNIT WITH
VARIABLE PITCH ROTOR BLADES

Filed Dec. 22, 1966  Sheet _1_ of 2

INVENTORS
Earl L. Egbert,
Paul H. Goodale, &
Paul D. Stevenson
BY Charles R. White
ATTORNEY Feb. 4, 1969  E. L. EGBERT ETAL  3,425,220
HYDRODYNAMIC TORQUE TRANSMITTING UNIT WITH
VARIABLE PITCH ROTOR BLADES
Filed Dec. 22, 1966

INVENTORS
Earl L. Egbert,
Paul H. Goodale, &
Paul D. Stevenson
BY Charles L. White
ATTORNEY United States Patent Office 3,425,220
Patented Feb. 4, 1969

3,425,220
HYDRODYNAMIC TORQUE TRANSMITTING UNIT
WITH VARIABLE PITCH ROTOR BLADES
Earl L. Egbert, Northville, Paul H. Goodale, Ann Arbor, and Paul D. Stevenson, Plymouth, Mich., assignors to General Motors Corporation, Detroit, Mich., a corporation of Delaware
Filed Dec. 22, 1966, Ser. No. 603,900
U.S. Cl. 60—54    13 Claims
Int. Cl. F16d *33/04;* F16h *41/08*

ABSTRACT OF THE DISCLOSURE

Control motor mechanism movably mounted in a rotor hub of a hydrodynamic torque transmitting unit which can be moved by control forces operative on the motor mechanism, to a first set position to turn the blades of a unit rotor to a closed, high-angle position for reducing torque transmission through the unit, or moved to a second set position to turn the blades to a fully open, low-angle position for efficient torque transmission by the unit, or moved to an intermediate position in response to increased torque demand to turn the blades to an intermediate angle position for increased torque multiplication by the unit.

---

This invention relates to hydrodynamic torque transmitting units and more particularly to a torque converter having a bladed rotor in which the angular position of the blades is varied by movement of a control motor mechanism mounted in a support to change the torque transmitting characteristics of the unit. The control motor mechanism for varying the blade angle in one embodiment is a multiple piston design in which unit charge pressure in an expansible chamber biases one of the pistons to a set position for high blade angle for reducing the torque transmitting capacity of the unit, and in which control pressure in another expansible chamber biases both pistons to a second set position to turn the blades to a low angle for economical unit operation. An intermediate blade angle position for maximum torque transmission is established by this construction by the utilization of one piston as a stop for holding the other piston in a third position.

In a second embodiment of the invention a unitary piston cooperates with a piston housing to provide multiple control chambers including an intermediate chamber which functions as a pressure regulating valve. This valve is operative under high torque demand conditions to establish an intermediate blade angle position for performance by balancing opposing forces on the piston through the automatic selective exhaust and pressurization of the intermediate chamber. High and low blade angles are established by the biasing of the piston to one extreme position in response to the pressurization of another control chamber and to an opposite extreme position by the exhaust of this latter control chamber.

It is an object of this invention to provide a hydrodynamic torque transmitting unit with a variable pitch bladed member in which the pitch of the blade is set by new and improved motor mechanism to high, low and intermediate angle positions to vary the torque transmitting characteristics of the unit.

Another object of this invention is to provide a hydrodynamic torque transmitting unit having a member with variable pitch blades thereon with the blades being varied in pitch by operation of a multiple piston motor mechanism.

Another object of this invention is to provide a hydrodynamic torque transmitting unit having a rotor with variable pitch blades and a single piston mechanism for moving the blades to high, low and intermediate angles with intermediate angle being established by operation of a pressure regulating valve structure formed by a portion of the piston.

Another object of this invention is to provide a hydrodynamic torque transmitting unit with variable pitch blades for varying unit torque transmitting characteristics in which the blades are all turned to a high angle position in response to a force on an expandable chamber motor mechanism, or to a low angle position in response to an opposing force on the mechanism, or to an intermediate angle position established by equalization of opposing forces on the motor mechanism in response to high torque demand on the unit.

Other objects and advantages of the invention will be apparent from the following detailed discription and drawings.

Figure 1:
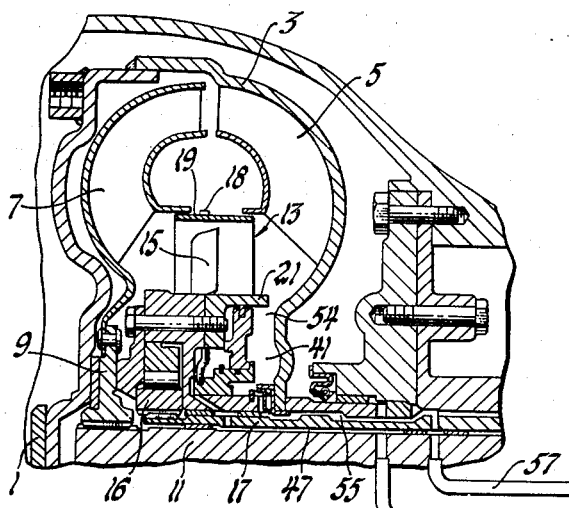
FIGURE 1 is a diagrammatic view of a torque converter transmission having a stator with variable pitch blading and having controls for varying the pitch of the stator blading.

In FIGURE 1 the vehicle transmission input 1 drives the housing 3 of a hydrodynamic torque converter that carries the bladed torque converter pump 5. The pump circulates fluid in the converter torus chamber in housing 3 to the bladed turbine 7 which is connected by hub 9 to the intermediate drive shaft 11. Fluid leaving the turbine enters the bladed stator 13 and is directed back to the pump by the stator blades 15. The stator is mounted on a one-way brake 16, which, inturn, is supported on a ground sleeve 17. The torque converter with the stator stationary functions to multiply torque in one phase of converter operation and with the stator rotating acts as an efficient fluid coupling in another phase of converter operation as is well known in the art.

The stator blades are fixed on cranks 18 which are pivotally supported by the support ring 19 and the stator hub 21. These blades are movable between high, intermediate and low angles with respect to the center line of the torque converter. The area of each of the stator blades 15 on the downstream side of its crank or pivot 18 is greater than the area on the upstream side so that the hydraulic force of liquid flowing past the blades tends to move the blades to the position of lowest angle or open position. Each of the cranks 18 has an offset portion which is seated in an annular groove 25 formed in an inner annular piston 27.

The piston 27 is mounted for reciprocal longitudinal movement on an inner cylindrical wall 28 and in a cavity formed in the hub. Snap ring 29 and radial wall 30 in the hub serve as limit stops for movement of piston 27. The piston 27 has an outer cylindrical shoulder 31 on which an outer annular piston 33 is mounted for longitudinal, reciprocal movement. Spaced flange 35 and snap ring 37 on the piston 27 serve as limit stops for limiting the relative movement between the two pistons. The outer piston 33 has a metallic seal ring 39 which contacts an outer cylindrical wall 38 of the stator hub 21 dividing the cavity into separate expansible and contractible pressure chambers 41 and 43. The outer piston 33 has a forwardly projecting annular stop portion 40 which can contact a radial wall 44 of the hub to limit movement of this piston to the left in response to converter charge pressure in chamber 41 and exhaust of pressure in chamber 43. The chamber 41 is always open to converter charge pressure as illustrated while the inner chamber 43 is hydraulically connected by passage 46 in the stator hub, passage 47 between the ground sleeve 17 and drive shaft 11, and the conduit 51 to a stator blade control valve 53. The converter charge inlet 54 is connected by passage 55 to converter charge conduit 57 which also has a branch 59 that leads into a port in valve 53.

The valve 53 includes a shiftable valve element 61 having spaced lands 63 and 65 mounted within a bore formed in the valve housing. One end of this bore provides an open end exhaust 67. The valve has an enlarged port 68 through which fluid is admitted to or exhausted from the conduit 51 and chamber 43. The valve element is biased to the left by a spring element 69 which is mounted on seat 71 and is biased to the right by pressure in end chamber 73 which is hydraulically connected by conduit 75 to a branch of a main line 77 of a transmission control system. Conduit 75 is also connected to a solenoid operated control valve 79 which has a port 81 for exhausting fluid from the end chamber 73.

The solenoid operated control valve includes a plunger 83 which is biased by spring 85 into seating engagement with the port 81 to prevent fluid from being exhausted from chamber 73 to establish low stator blade angle. The solenoid 86 is connected by a circuit through a first switch 87 to a battery 89 or a second circuit through a second switch 91 to the battery 89. A throttle pedal 93 and carburetor control linkage not illustrated are provided to control the power levels of an engine for the transmission of FIGURE 1.

When the throttle pedal is in the closed throttle or idle position, the switch 87 is closed and solenoid 86 is energized. The plunger 83 will be retracted from port 81 and the chamber 73 will be open to exhaust 88. The spring 69 will bias the valve element 61 to the extreme left position to open the port 68 and the control chamber 43 to exhaust 67. The converter charge pressure will then move the dual pistons to the FIGURE 1 position with the inner piston biased by converter charge pressure into engagement with the radial wall of the stator hub against the opposing force exerted by cranks 18. When the inner piston 27 is in this position, the stator blades will be turned to their closed or high angle position and the torque converter capacity for absorbing input torque at a given speed is substantially reduced. Since the idling engine is operating at a low torque level, the tendency of the vehicle to creep will be substantially reduced.

Figure 3:
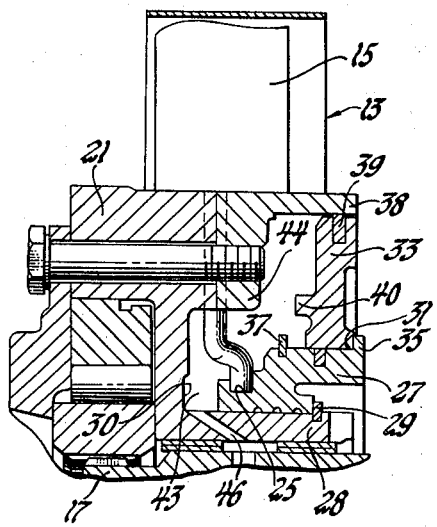

As the throttle pedal is moved from the closed position to a mid-throttle position, for example, the switch 87 will open to de-energize the solenoid 86 and the spring 85 biases the plunger 83 into port 81 so that line pressure can build up in the chamber 73 to bias the valve element 61 to the right, closing off the exhaust 67 and opening conduit 51 to the converter charge branch line 59. Under these conditions the chamber 43 is pressurized. The force of this pressure on the pistons will bias the two pistons to their FIGURE 3 position. This turns the stator blades to their low blade angle and allows the converter to efficiently operate to transmit torque for vehicle drive.

Figure 2:
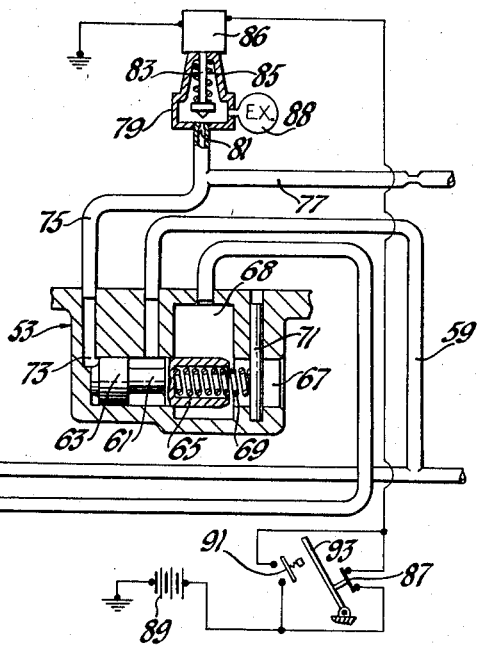
FIGURE 2 and 3 are enlarged views of the stator construction of FIGURE 1 illustrating operation of the motor control mechanism for varying the pitch of the stator blades.
Figure 2:
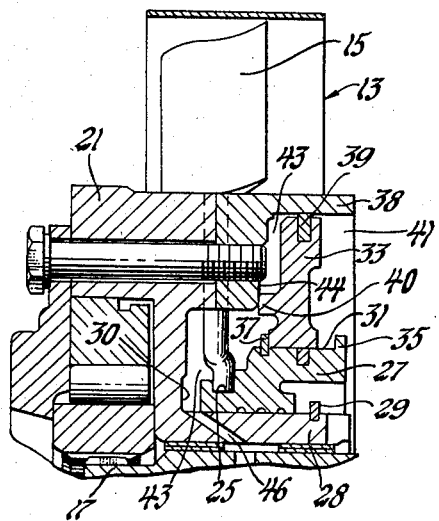

As the throttle pedal is moved to the full throttle position for operating the engine at a high power level, the switch 91 is closed to energize the solenoid 86 and retract plunger 83 from the port 81. The valve element 61 in the control valve will move to its FIGURE 1 position under the bias of spring 69 and the chamber 43 in the stator will be exhausted. Under these conditions a high torque about the cranks is developed by the converter fluid on the stator blades. These cranks exert a force on the inner piston to move it into engagement with the outer piston with snap ring 37 providing the contact. The converter charge pressure in chamber 41 provides a biasing force to move both pistons to the left against the opposing force of the cranks until mid-position is established by contact of stop 40 on the outer piston with the radial wall 44. At this point the force exerted by the cranks on inner piston 27 cannot overcome the opposing force of converter charge pressure which is effective on both pistons at mid-position. Also, the converter charge pressure is insufficient to move the inner piston alone against the opposing force exerted by the stator blade cranks on this piston. The stator blades are thus turned to the FIGURE 2 position between high and low angle. The engine can run at higher power levels than when the stator blades are at low angle and the converter is more efficient than when the stator blades are at high blade angle. Therefore, the converter can provide for increased torque multiplication and vehicle performance when in this condition.

Figure 4:
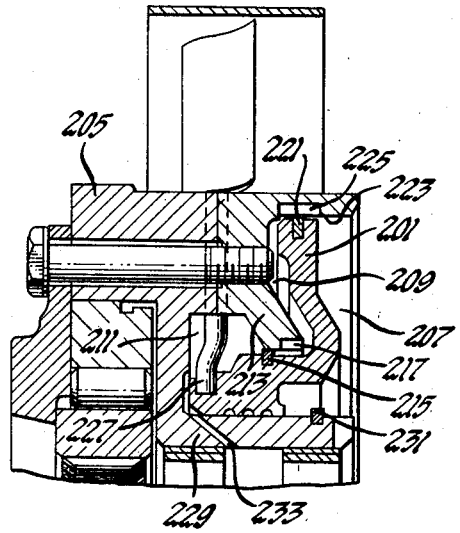
FIGURES 4, 5 and 6 are enlarged views of a portion of another stator which may be used in place of the FIGURE 1 stator construction and illustrating operation of the motor mechanism for varying the stator blade pitch.
Figure 6:
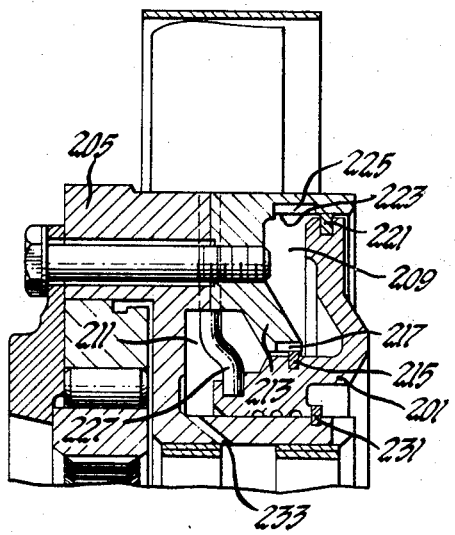
Figure 5:
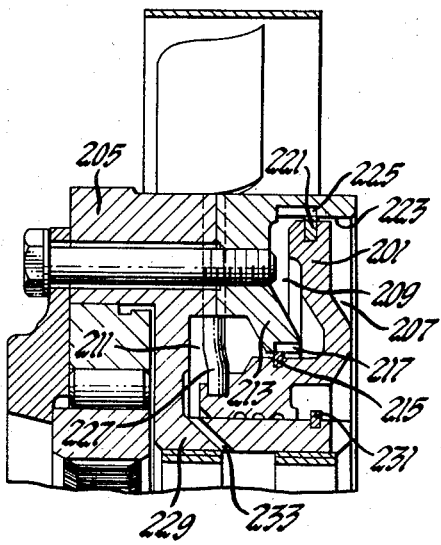

In a second embodiment of the invention, illustrated in FIGURES 4 to 6, there is a variation in the stator hub and piston construction as compared to the first embodiment. As shown in these figures, there is a single annular piston 201 slidably mounted in an annular cavity formed by the two-part stator hub 205. The piston fits within this cavity and cooperates with the stator hub to provide the pressure chambers 207, 209 and 211.

As shown, the hub has an annular wall 213 which contacts the annular metallic ring seal 215 carried by the shoulder of the piston 201 to separate chambers 209 and 211 from each other. The inner portion of this wall is formed with a plurality of inwardly-extending recesses 217 which provide for hydraulic communication between chambers 209 and 211 under certain operating conditions. The outer annular edge of the piston 201 carries a metallic ring seal 221 which cooperates with the inner annular surface 223 in the stator hub to separate chamber 207 from chamber 209. The surface, however, is formed with spaced recesses 225 which provide for hydraulic communication between chambers 207 and 209 under certain operating conditions.

The piston projects inwardly into the hub and has an annular groove for the reception of the outer stator cranks 227. The piston is longitudinally, reciprocally movable in the hub, limited by abutment stop with the radial wall 229 of the hub and contact with a snap ring 231 fitted into the hub. Passage 233 leads from the chamber 211 to a conduit such as stator control conduit 51 of the previously described embodiment. The controls for the FIGURES 4 to 6 embodiment are the same as those described in connection with the FIGURES 1 through 3 embodiment. The other parts of the converter are also the same.

When the engine is idling and the chamber 211 is exhausted, converter charge pressure enters the chamber 209 from the chamber 207 through the recesses 225; this pressure is effective on the area differential of piston 201 to move it to the FIGURE 4 position. Movement of the piston to this position turns the cranks 227 and the stator blades to their high angle, anti-creep position.

For performance the throttle control is placed in the wide open position and chamber 211 remains open to the exhaust. The increased circulation of converter fluid at high engine throttle turns the blades toward a high angle position and the blade cranks exert a force to move the piston to the right. However, the piston will only move to an equilibrium position between the low and high angle position, illustrated in FIGURE 5, with chamber 209 and piston 201 operating as a pressure regulating valve. Any time the crank force becomes greater than the opposing force of the converter charge pressure on the piston, the piston will move slightly further to the right so that the seal provided by ring 215 is broken and chamber 209 is open to the exhaust. With chamber 209 exhausted, the converter charge pressure biases the piston back to the equilibrium position. If the piston moves too far to the left, the chamber 209 opens to admit converter charge pressure through the recess 225 and thereby reduces the effective force pushing the piston to the left. With this force reduction the crank force is sufficient to move the piston back to the equilibrium position. With the intermediate stator blade angle established by the pressure regulating construction, the engine can be operated at a higher power level and the engine torque is multiplied and transmitted by the torque converter to the intermediate shaft for vehicle performance.

For economy operation the chambers 211 and 209 are pressurized and the piston will be moved by a force greater than the opposing force of converter charge pressure to the FIGURE 6 position to turn the stator blade cranks and the stator blades to the low angle position. The converter can then operate with maximum efficiency.

We claim:

1. A hydrodynamic torque transmitting unit which circulates fluid therein to transmit torque from a torque input means to an output means comprising in combination, a member having a plurality of fluid-directing blades disposed in the path of the fluid in the unit which are angularly adjustable between high and low and intermediate positions with respect to the center line of said unit, motor means for angularly adjusting said blades responsive to low torque demand on said unit to move and hold said blades to said high angle position to thereby reduce the torque transmitting capability of said unit and responsive to a high torque demand on said unit to position and hold said blades at said intermediate angle position to increase the torque transmitting capability of said unit and further responsive to intermediate torque demand on said unit to position and hold said blades at said low angle position to condition said unit for its highest efficiency for transmitting torque.

2. The torque transmitting unit of claim 1, said motor means being formed by a pressure responsive piston mechanism, a support having a cavity therein, said piston mechanism being slidably mounted on said support and dividing said cavity in a plurality of chambers, said piston mechanism including means effective to reducee the area of one side of said piston mechanism to permit fluid pressure in one of said chambers to move said piston mechanism to a maximum position to establish high blade angle.

3. The torque transmitting unit of claim 1, a support, said motor means being mounted in said support and cooperating therewith to form a plurality of expansible and contractible chambers, said motor means being formed by a plurality of movable parts, a first part of said motor means being slidably mounted on a second part thereof, means for limiting the relative sliding of said parts, means for limiting the movement of said first part in one direction in response to pressure in one of said chambers, said second part being subsequently slidable in said one direction relative to said first part to move said blades to their high angle position.

4. The torque transmitting unit of claim 3 wherein said first part is held by pressure in said one chamber to position said second part in an intermediate position when said second part is moved in an opposite direction in response to increased torque transmitted from said blades to said second part.

5. The torque transmitting unit of claim 1 wherein said motor means is formed by first and second pistons, said first piston being slidably mounted on said second piston, support means for slidably supporting said second piston, said support means being divided by said pistons into a plurality of pressure chambers, said second piston being biased in one direction by a pressure in one chamber to a limited position to establish high blade angle and being biased in an opposite direction by a force into engagement with said second piston to establish intermediate blade angle, said first and second pistons being biased by fluid pressure in a second of said chambers in the latter mentioned direction to their limit to move said blades to low blade angle position.

6. The torque transmitting unit of claim 1 wherein said motor means is formed by a piston, support means slidably supporting said piston, said support means having a chamber therein divided by said piston into a plurality of fluid receiving chambers, one part of a first and second of said chambers being formed in part by one side of said piston, another of said chambers being formed in part by the other side of said piston, means for opening said first chamber to exhaust and said second and third chambers to fluid pressure to move said motor means to a position to establish high blade angle.

7. The torque transmitting unit of claim 1 said member providing support means for said motor means, said motor means being a piston, said piston forming a plurality of chambers in said support means at one side of said piston and at least one chamber at the other side of said piston, one of said plurality of chambers being operative as a pressure regulating chamber to allow said piston to be positioned at a position to move said blades to an intermediate angular position.

8. The torque transmitting unit of claim 1 said bladed member providing a support for slidably supporting said motor means, said motor means and said support forming first and second fluid receiving chambers to one side of said piston and a third fluid receiving chamber at the other side of said piston, first passage means for hydraulically connecting said first and second chambers to permit fluid pressure to move said piston to a low angle position, second passage means for hydraulically connecting said first and third chambers to permit fluid pressure in said first and third chambers to move said piston to a high angle position, said piston being moved to an intermediate position from said high angle position in response to increased force on said piston from the blades of said member, said first chamber acting as a pressure regulator valve responding to further increased blade force to open said first chamber to exhaust and allow fluid pressure to move said piston against the force of said blades and being further responsive to increased third chamber pressure to charge said second chamber with fluid to permit the force transmitted to said piston from said blades to move said piston against the force applied to said piston by the fluid in said third chamber.

9. In a hydrodynamic unit for transmitting torque from an input means to an output means, a member having a plurality of blades positioned in the path of fluid circulated within said unit, pressure responsive means to position all of said blades at a high angle or at a low angle or at an intermediate angle with respect to the center line of said unit, piston means for moving said blades to a high angle position, said piston means including means for increasing the effective area on one side thereof to allow unit fluid pressure to maintain said piston means at a position to establish intermediate blade angle position.

10. The hydrodynamic unit defined in claim 9 wherein said piston means is formed by relatively movable first and second pistons, said second piston being mounted on said first piston for longitudinal movement thereon, and said second piston having spaced stop means thereon for limiting the relative movement of said pistons.

11. The hydrodynamic unit of claim 9 wherein said piston means is a single piston, said piston providing a plurality of chambers one side thereof, and one of said chambers being a pressure regulating chamber.

12. The hydrodynamic torque transmitting unit for transmitting torque from an input to an output, said unit having a plurality of blades thereon for circulating fluid in said unit, means pivotally mounting said blades on said member, fluid pressure responsive motor means operatively connected with said last mentioned means for simultaneously moving said blades between high, low and intermediate angles with respect to the center line of said unit, said motor means being formed solely by a single piston member, a support, said piston member cooperating with said support to form a plurality of pressure chambers, one of said chambers being exhausted for high angle position, and fluid pressure regulating means formed by part of said piston member for establishing an intermediate blade angle position.

13. The torque transmitting unit of claim 12 wherein said regulating means provides an expansible and contractible pressure regulating chamber.

References Cited

UNITED STATES PATENTS

| 2,882,684 | 4/1959 | Kelley | 60—12 XR |
| 2,932,939 | 4/1960 | Hause | 60—54 XR |

EDGAR W. GEOGHEGAN, *Primary Examiner.*